(12) United States Patent
Hirai et al.

(10) Patent No.: US 8,751,187 B2
(45) Date of Patent: Jun. 10, 2014

(54) APPARATUS FOR CALCULATING TEMPERATURE OF CONDUCTIVE CARRIER OF CATALYST CONVERTER

(75) Inventors: Taro Hirai, Kariya (JP); Noriaki Ikemoto, Kariya (JP); Takeshi Harada, Kariya (JP); Naoyuki Kamiya, Kariya (JP)

(73) Assignee: Denso Corporation, Kariya (JP)

( * ) Notice: Subject to any disclaimer, the term of this patent is extended or adjusted under 35 U.S.C. 154(b) by 234 days.

(21) Appl. No.: 13/096,284

(22) Filed: Apr. 28, 2011

(65) Prior Publication Data

US 2011/0270568 A1 Nov. 3, 2011

(30) Foreign Application Priority Data

Apr. 28, 2010 (JP) ................................. 2010-103574

(51) Int. Cl.
*G01K 7/16* (2006.01)
(52) U.S. Cl.
USPC .............................. 702/133; 701/108; 60/274
(58) Field of Classification Search
USPC .............................. 702/133; 701/108; 60/274
See application file for complete search history.

(56) References Cited

U.S. PATENT DOCUMENTS

| | | | |
|---|---|---|---|
| 5,758,492 A | 6/1998 | Kato et al. | |
| 2004/0230366 A1 | 11/2004 | Ueda et al. | |
| 2005/0228572 A1* | 10/2005 | Mansbart | 701/108 |
| 2008/0282673 A1* | 11/2008 | Gonze et al. | 60/284 |
| 2009/0019833 A1* | 1/2009 | Yonushonis et al. | 60/277 |
| 2009/0064663 A1* | 3/2009 | Ma et al. | 60/277 |
| 2010/0063662 A1* | 3/2010 | Harada et al. | 701/22 |

FOREIGN PATENT DOCUMENTS

| | | |
|---|---|---|
| JP | H05-001526 | 1/1993 |
| JP | H09-125943 | 5/1997 |
| JP | P2002-122018 A | 4/2002 |
| JP | P2004-211577 A | 7/2004 |
| JP | 2004-263606 | 9/2004 |
| JP | 3602614 | 10/2004 |
| JP | P2005-194935 A | 7/2005 |
| JP | P2007-113467 A | 5/2007 |
| JP | P2009-191681 A | 8/2009 |

\* cited by examiner

*Primary Examiner* — John Breene
*Assistant Examiner* — Stephanie Bloss
(74) *Attorney, Agent, or Firm* — Nixon & Vanderhye, P.C.

(57) ABSTRACT

In an apparatus, a temperature obtainer obtains, in a learning mode of the apparatus during a conductive carrier being deenergized a, value of a carrier temperature based on a physical parameter correlative with the carrier temperature and different from a carrier resistance. A resistance obtainer instantaneously energizes, in the learning mode, the conductive carrier to obtain a value of the carrier resistance during the instant energization. A calculator obtains, in a normal operation mode of the apparatus after the learning mode, a value of the carrier resistance, and calculates, in the normal operation mode, a value of the carrier temperature based on: the obtained value of the carrier resistance in the normal operation mode, and a pair of the value of the carrier temperature and the value of the carrier resistance obtained in the learning mode.

14 Claims, 6 Drawing Sheets

APPARATUS FOR CALCULATING TEMPERATURE OF CONDUCTIVE CARRIER OF CATALYST CONVERTER

CROSS REFERENCE TO RELATED APPLICATIONS

This application is based on Japanese Patent Application 2010-103574 filed on Apr. 28, 2010. This application claims the benefit of priority from the Japanese Patent Application, so that the descriptions of which are all incorporated herein by reference.

TECHNICAL FIELD

The present disclosure relates to apparatuses for calculating temperature of a conductive carrier of an electrically heated catalyst converter to be used for cleaning engine emissions.

BACKGROUND

Engine emission control is one of the important technologies installed in modern motor vehicles. In order to clean exhaust emissions through the exhaust pipe of an internal combustion engine, a catalyst is normally provided in the exhaust pipe. Catalysts are characterized to activate with their temperatures equal to or higher than an activation temperature, and, in the activated state, oxidize particular components in the exhaust emissions. Thus, when the temperature of a catalyst provided in the exhaust pipe is lower than its activation temperature during, for example, engine start-up, heating the carrier of the catalyst to activate the catalyst as soon as possible is required. As an example of how to heat the carrier of a catalyst, U.S. Pat. No. 5,758,492 corresponding to Japanese Examined Patent Publication No. 3602614 discloses an electrically heated catalyst converter, referred to simply as an "EHC converter", which supplies current to the conductive carrier of the EHC converter to thereby heat the conductive carrier.

SUMMARY

For determination of whether the temperature of the conductive carrier of the EHC converter increases up to the activation temperature of the catalyst, and/or determination of whether the conductive carrier of the EHC converter excessively rises in temperature to a degree that there may be a risk of thermal damage of the EHC converter, it is necessary to obtain the temperature of the conductive carrier of the EHC converter. In addition, when the conductive carrier of the EHC converter is energized, temperature T of the carrier of the EHC converter and resistance R of the energized portion of the carrier have a correlation therebetween; this correlation will be referred to as an "R-T characteristic" (see FIG. 4). Thus, measuring a value of the resistance R during the conductive carrier being energized allows calculation of the temperature T of the carrier using the R-T characteristic. This can eliminate temperature sensors for measuring the temperature T thereof.

The R-T characteristics of the conductive carriers of the EHC converters are different from each other due to variations in the individual differences of the conductive carriers and/or aging variations thereof. Thus, it is necessary to learn a deviation of an actual R-T characteristic of the conductive carrier of an EHC converter from a reference R-T characteristic unaffected by the individual differences of conductive carriers and the aging variations thereof.

Generally, a conductive carrier is produced by adding conductive material to base material, such as ceramic material. Non-uniform distribution of the conductive material, non-uniform distribution of the density of the base material, and/or non-uniform thickness of the conductive carrier may cause different resistance portions in the conductive carrier.

Specifically, if the conductive carrier of a catalyst converter has a portion with lower resistance than the remaining portions, current supplied to the conductive carrier flows locally through the lower-resistance portion.

This results in an increase in temperature of the lower-resistance portion with the measured resistance lower than a corresponding value on the reference R-T characteristic. Thus, if the reference R-T characteristic were corrected based on the measured resistance and a value of the temperature of the conductive carrier calculated based on the measured resistance, the corrected reference R-T characteristic would be different from the actual R-T characteristic between the measured resistance and an actual value of the temperature T of the conductive carrier. In other words, the reference R-T characteristic would be erroneously learned. This would reduce the accuracy of calculation of the temperature T of the conductive carrier using the erroneously learned reference R-T characteristic.

In view of the circumstances set forth above, an aspect of the present disclosure seeks to provide apparatuses for calculating temperature of a conductive carrier of an electrically heated catalyst converter; these apparatuses are designed to solve the problem set forth above.

Specifically, an alternative aspect of the present disclosure aims to provide such apparatuses capable of calculating the temperature of the conductive carrier with high accuracy.

According to one aspect of the present disclosure, there is provided an apparatus for calculating a temperature of a conductive carrier of a catalyst converter for cleaning an exhaust emission out of an internal combustion engine. The conductive carrier carries a catalyst of the catalyst converter, and is energized for warm of the catalyst. The apparatus includes a temperature obtainer to obtain, in a learning mode of the apparatus during the conductive carrier being deenergized, at least one value of the temperature of the conductive carrier based on a physical parameter correlative with the temperature of the conductive carrier and different from a resistance of the conductive carrier. The apparatus includes a resistance obtainer to instantaneously energize, in the learning mode, the conductive carrier to obtain at least one value of the resistance of the conductive carrier during the instant energization. The apparatus includes a calculator to obtain, in a normal operation mode of the apparatus after the learning mode, a value of the resistance of the conductive carrier, and calculate, in the normal operation mode, a value of the temperature of the conductive carrier based on: the obtained value of the resistance of the conductive carrier, and a pair of the at least one value of the temperature of the conductive carrier and the at least one value of the resistance of the conductive carrier obtained in the learning mode.

According to another aspect of the present disclosure, there is provided a method for calculating a temperature of a conductive carrier of a catalyst converter for cleaning an exhaust emission out of an internal combustion engine. The conductive carrier carries a catalyst of the catalyst converter, and is energized for warm of the catalyst. The method includes obtaining, in a learning mode of the apparatus during the conductive carrier being deenergized, at least one value of the temperature of the conductive carrier based on a physical parameter correlative with the temperature of the conductive carrier and different from a resistance of the conductive carrier. The method includes instantaneously energizing, in the learning mode, the conductive carrier to obtain at least one value of the resistance of the conductive carrier during the instant energization. The method includes obtaining, in a normal operation mode of the apparatus after the learning mode, a value of the resistance of the conductive carrier. The method includes calculating, in the normal operation mode, a value of the temperature of the conductive carrier based on: the obtained value of the resistance of the conductive carrier, and a pair of the at least one value of the temperature of the conductive carrier and the at least one value of the resistance of the conductive carrier obtained in the learning mode.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENTS

Embodiments of the present disclosure will be described hereinafter with reference to the accompanying drawings. In the drawings, identical reference characters are utilized to identify corresponding identical components.

First Embodiment

Figure 1:
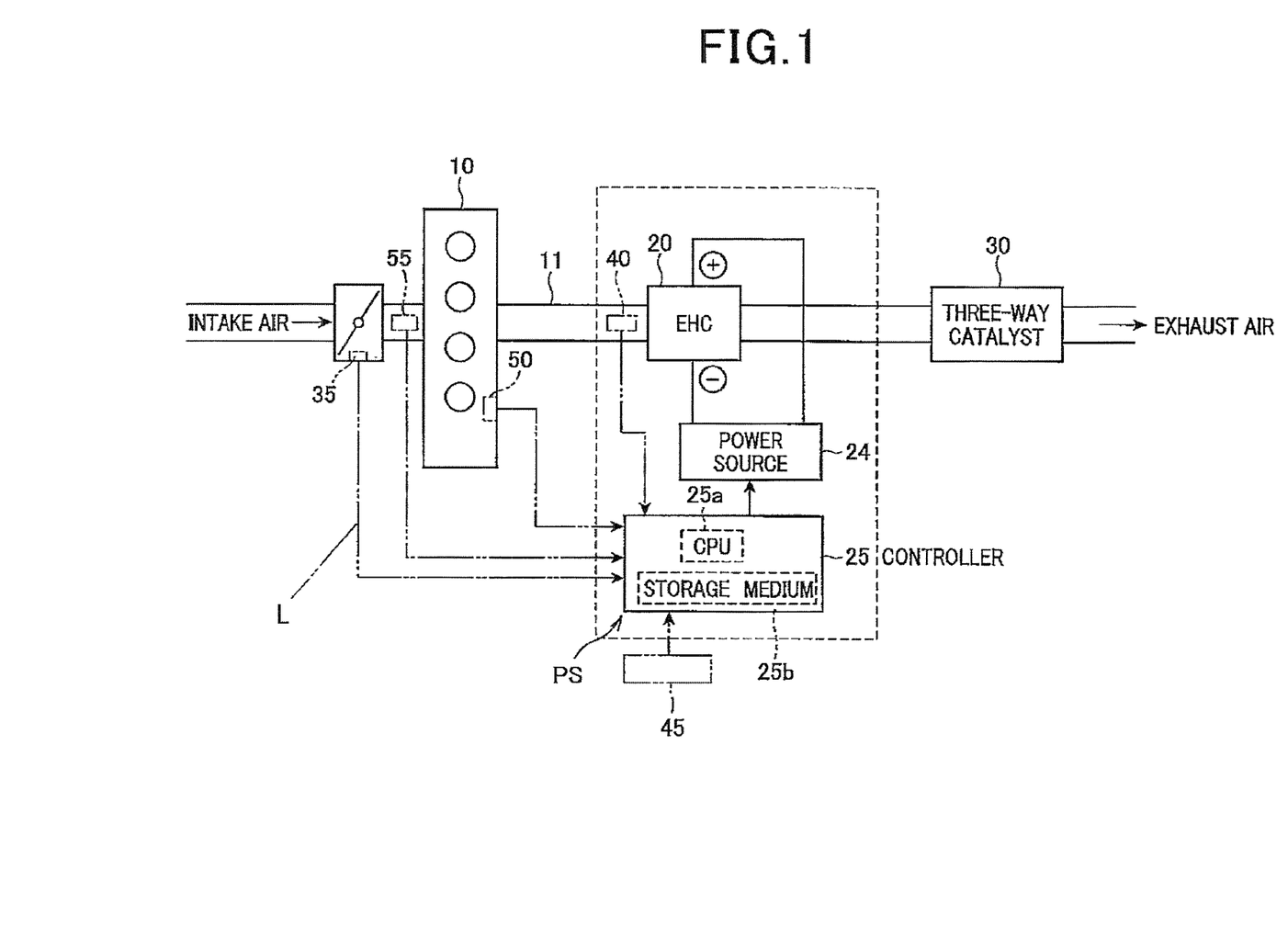
FIG. 1 is a schematic structural view of a power supply system for supplying power to an electrically heated catalyst (EHC) converter located in an exhaust pipe of an internal combustion engine according to the first embodiment of the present disclosure.

Referring to FIG. 1, there is illustrated an internal combustion engine 10 with an exhaust pipe 11, an electrically heated catalyst converter (EHC converter) 20, and a power supply system PS for supplying power to the EHC converter 20.

As an example of internal combustion engines, a spark-ignited gasoline engine is used. The spark-ignited gasoline engine, referred to simply as an engine, 10 is installed in a motor vehicle. The motor vehicle installs therein a drive motor (not shown). The engine 10 and drive motor cooperatively operate as a drive source of the motor vehicle.

Specifically, the engine 10 works to compress air-fuel mixture by the piston within each cylinder using intake air, and to burn the compressed air-fuel mixture within each cylinder. This changes the fuel energy to mechanical energy, such as rotative energy, to reciprocate the piston within each cylinder, thus rotating a crankshaft (not shown) of the engine 10. The rotation of the crankshaft is transferred to driving wheels through a powertrain installed in the motor vehicle to thereby drive the motor vehicle.

The drive motor works to rotate the crankshaft when energized.

In the exhaust pipe 11 of the engine 10, the EHC converter 20 and a three-way catalyst 30 are provided. The EHC converter 20 is located downstream of the engine 10, and the three-way catalyst 30 is located downstream of the EHC converter 20. The EHC converter 20 is characterized to activate with its temperature equal to or higher than a predetermined activation temperature, and, in the activated state, the EHC converter 20 oxidizes hydrocarbons (HC) in exhaust emissions out of the engine 10 through the exhaust pipe 11, and reduces carbon monoxide (CO) and oxides of nitrogen (NOx) in the exhaust emissions to purify the HC, CO, and NOx. Similarly, the three-way catalyst 30 is characterized to activate with its temperature equal to or higher than a predetermined activation temperature, and, in the activated state, the three-way catalyst 30 oxidizes HC in the exhaust emissions through the exhaust pipe 11, and reduces CO and NOx in the exhaust emissions to purify the HC, CO, and NOx.

For example, the EHC converter 20 is smaller in size than the three-way catalyst 30 to reduce the time required for the EHC converter 20 to reach the activation temperature.

Figure 2:
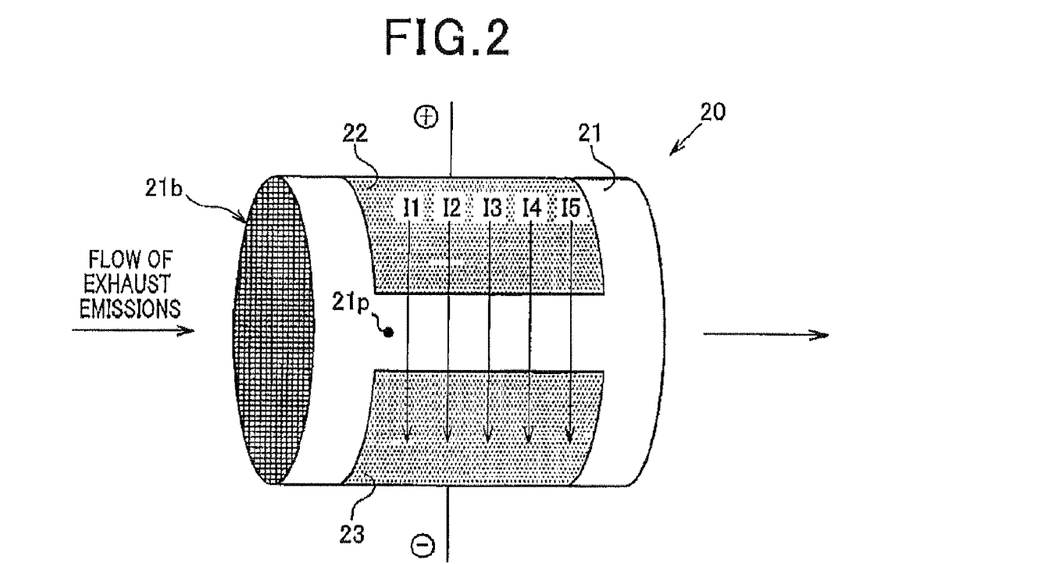
FIG. 2 is an enlarged perspective view of the EHC converter illustrated in FIG. 1.

FIG. 2 is an enlarged perspective view of an example of the structure of the EHC converter 20. The EHC converter 20 is comprised of a substantially cylindrical ceramic carrier 21 with conductivity.

Note that an apparatus for calculating temperature of the ceramic carrier 21 according to the first embodiment of the present disclosure is, for example, designed as a part of the power supply system PS; this apparatus can be referred to as a "temperature calculating apparatus" hereinafter.

The power supply system PS includes a pair of positive and negative electrodes 22 and 23, a power source 24, and a controller 25. The positive electrode 22 is mounted on one part of the outer circumferential surface of the ceramic carrier 21, and the negative electrode 23 is so mounted on another part of the outer circumferential surface of the ceramic carrier 21 as to be opposite to the positive electrode 22 with gaps therebetween.

Figure 3:
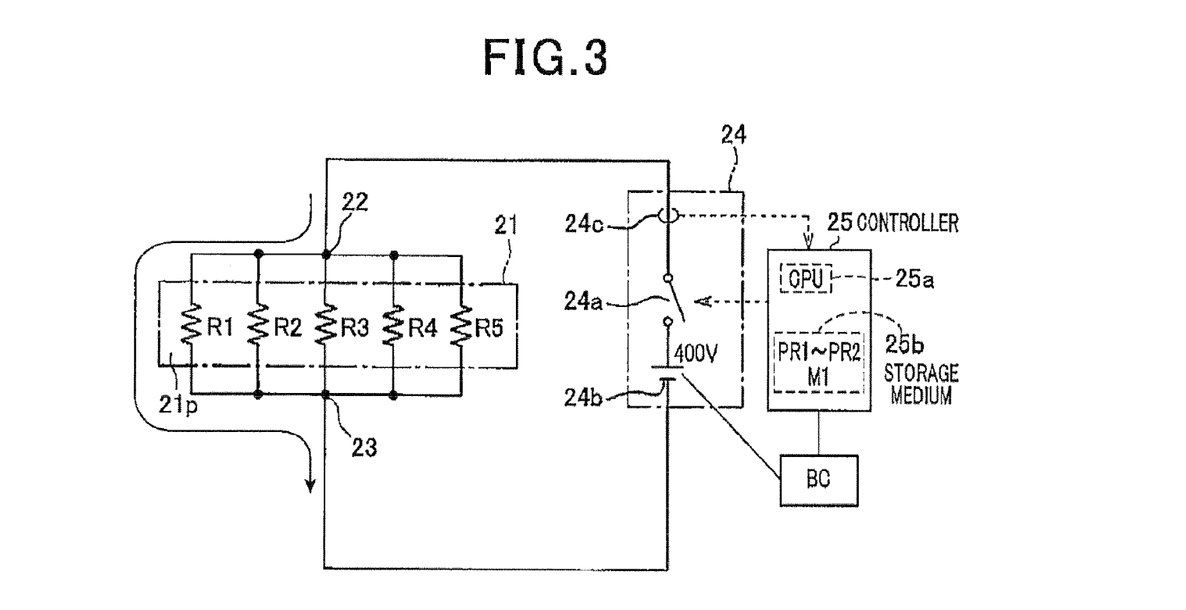
FIG. 3 is an equivalent circuit diagram of the power supply system and the ceramic carrier of the EHC converter according to the first embodiment.

The power source 24 is electrically connected with the positive and negative electrodes 22 and 23 via corresponding conductors (wires). As illustrated in FIG. 3, the motor vehicle according to the first embodiment includes a battery, such as a lithium rechargeable battery, 24b for driving the drive motor. The power source 24 is designed to apply a terminal voltage of, for example, an approximately 400 Volts (V), across the positive and negative terminals 22 and 23. The power source 24 also includes a switch 24a located at the conductor between the battery 24b and the positive terminal 22. The switch 24 is controllably connected with the controller 25, and is designed to open or close according to instructions sent from the controller 25.

That is, when the terminal voltage is applied across the positive and negative electrodes 22 and 23, currents flow from the positive electrode 22 to the negative electrode 23 through the ceramic carrier 21 (see reference characters I1 to I5 in FIG. 2). This causes the ceramic carrier 21 to heat up, increasing in temperature.

The power source 24 also includes a current sensor 24c for measuring supply current from the battery 24b to the ceramic carrier 21. The current sensor 24c is electrically connected with the controller 25, and the current value measured by the current sensor 24c is output therefrom to the controller 25.

Generally, conductive ceramic is produced by adding conductive material to ceramic material. Non-uniform distribution of the conductive material, non-uniform distribution of the density of the ceramic material, and/or non-uniform thickness of the conductive ceramic may cause different resistance portions in the conductive ceramic.

For at least these reasons, the conductive ceramic carrier 21 consists of a plurality of identically-shaped unit portions with different resistance values. For example, if the electrically conducting path of the ceramic carrier 21 between the positive and negative electrodes 22 and 23 consists of five unit sections in the direction of the current with different resistance values, the electrical connection between the positive and negative electrodes 22 and 23 via the ceramic carrier 21 can be expressed as an equivalent circuit illustrated in FIG. 3 in which five resistors R1 to R5 with different resistance values are connected between the positive and negative electrodes 22 and 23 in parallel with each other.

Reference characters I1 to I5 illustrated in FIG. 2 represent currents individually flowing through the respective resistors R1 to R5. For example, if the resistance value of the resistor R1 is the lowest in the five resistors R1 to R5, the current I1 is the highest in all of the currents I1 to I5 (see the arrow illustrated in FIG. 3). This causes the amount of heat of the unit portion of the ceramic carrier 21 corresponding to the resistor R1 to increase more than another unit portion; this unit portion corresponding to the resistor R1 with the highest resistance value will be referred to as a lower-resistance portion 21p hereinafter. Because the ceramic carrier 21 has an NTC (Negative Temperature Coefficient) characteristic in which electrical resistance of the ceramic carrier 21 drops with temperature increase, the lower-resistance portion 21p may become locally-heated state in which temperature increase in the lower-resistance portion 21p more reduces the resistance of the lower-resistance portion 21p, thus accelerating the temperature increase in the lower-resistance portion 21p.

A battery controller BC installed in the motor vehicle is operative to measure the terminal voltage of the battery 24b to control the amount of charge in the battery 24b based on the measured terminal voltage. The battery controller BC is also operative to supply, to the controller 25, the measured terminal voltage.

The controller 25 is designed as, for example, a normal microcomputer circuit consisting of, for example, a CPU 25a; a storage medium 25b including a ROM (Read Only Memory), such as a rewritable ROM, a RAM (Random Access Memory), and the like; an I/O (Input and output) interface; buses; and so on. The CPU 25a, storage medium 25b, and the I/O interface are communicably connected with each other via the buses. The storage medium 25b stores therein beforehand various programs including a learning program PR1 and a temperature calculating program PR2 described later.

Specifically, the controller 25, that is, its CPU 25a, is operative to calculate, based on the measured current value inputted from the current sensor 24 and the measured terminal voltage inputted from the battery controller BC, resistance R of the electrically conducting path of the ceramic carrier 21 between the positive and negative electrodes 22 and 23; the resistance R is equivalent to the combined resistance of the resistance values of the resistors R1 to R5. The resistance R of the electrically conducting path of the ceramic carrier 21 between the positive and negative electrodes 22 and 23 will also be referred to as a "resistance R of the ceramic carrier 21".

Note that temperature T of the ceramic carrier 21 and the resistance R of the electrically conducting path of the ceramic carrier 21 between the positive and negative electrodes 22 and 23 have a correlation therebetween; this correlation will be referred to as an "R-T characteristic" of the ceramic carrier 21. In the first embodiment, the storage medium 25b stores therein a map M1 designed as, for example, a data table, a program, and/or a formula; this map M1 represents the R-T characteristic between a variable of the temperature T of the ceramic carrier 21 and a variable of the resistance R of the electrically conducting path of the ceramic carrier 21 between the positive and negative electrodes 22 and 23. The map M1 can have been determined based on data obtained by tests and/or simulations using the power supply system PS, the engine 10, and the EHC converter 20 or their equivalent computer models.

Specifically, the CPU 25a of the controller 25 is operative to reference the map M1 using a calculated value of the resistance R of the ceramic carrier 21 as a key to extract, based on a result of the reference, a value of the temperature T of the ceramic carrier 21 corresponding to the calculated value of the resistance R thereof. In the first embodiment, as described above, the R-T characteristic of the ceramic carrier 21 is the NTC characteristic. In other words, the ceramic carrier 21 is made from, for example, an SiC (Silicon Carbide) material having such an NTC characteristic.

Figure 4:
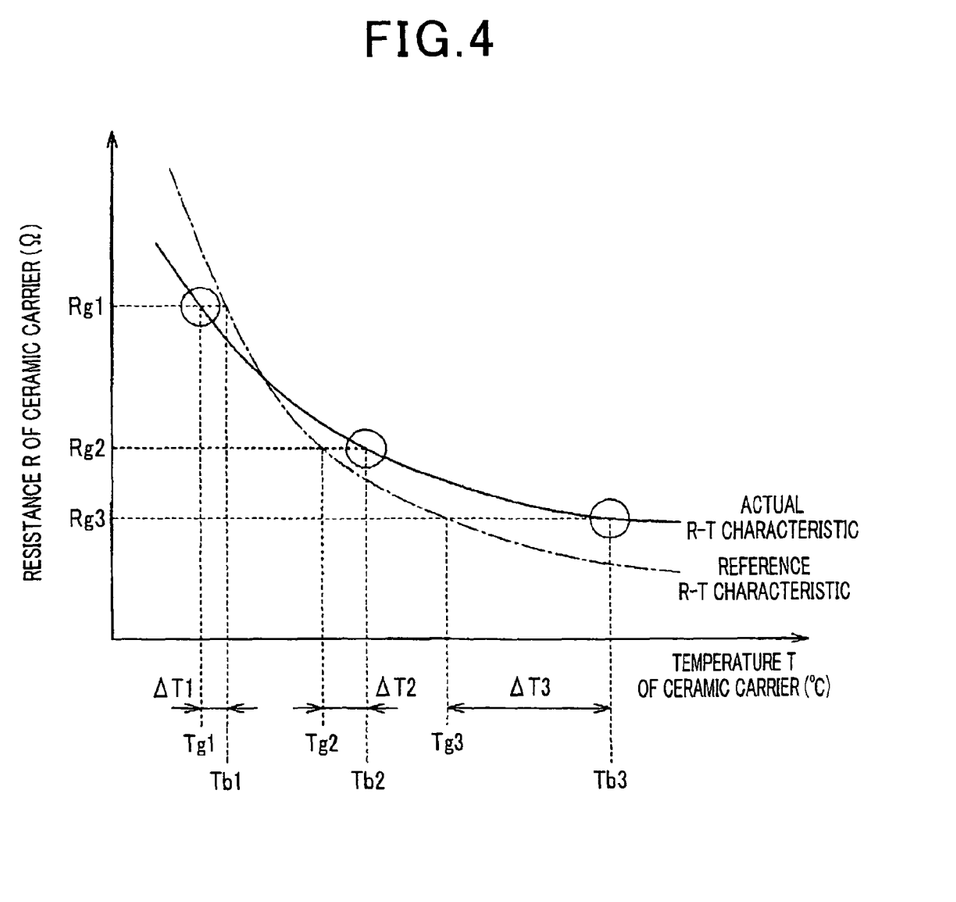
FIG. 4 is a graph schematically illustrating a reference R-T characteristic of a ceramic carrier, and an actual reference R-T characteristic of the same ceramic carrier according to the first embodiment.

The R-T characteristics of the conductive carriers of EHC converters are different from each other due to variations in the individual differences of the conductive carriers and/or aging variations thereof. For example, the alternate long and short dashed line in FIG. 4 shows a reference R-T characteristic of a ceramic carrier unaffected by the individual differences of conductive carriers and the aging variations thereof, which corresponds to the R-T characteristic of the map M1 stored in the storage medium 25b. In contrast, the solid line in FIG. 4 shows an actual R-T characteristic deviated from the reference R-T characteristic due to the individual differences of conductive carriers and the aging variations thereof. Thus, it is necessary to periodically learn the deviation of an actual R-T characteristic of the conductive carrier 21 (a correlation between an actual value of the resistance R of the ceramic carrier 21 and an actual value of the temperature T thereof) from the reference R-T characteristic stored in the storage medium 25b, and correct the reference R-T characteristic based on the deviation.

However, as described above with reference to the arrow in FIG. 3, the variations in the resistances R1 to R5 cause temperature nonuniform distribution in the ceramic carrier 21.

Particularly, if the ceramic carrier 21 is in the locally-heated state, there are considerable variations in the temperature nonuniform distribution. For this reason, if the temperature T of the ceramic carrier 21 is calculated with reference to the R-T characteristic using a value (measured value) calculated based on a value of current measured by the current sensor 24c while there is temperature nonuniform distribution in the ceramic carrier 21, the calculated value of the temperature T of the ceramic carrier 21 is different from an actual value of the temperature T thereof.

Thus, if the R-T characteristic were corrected based on the measured value of the resistance R of the ceramic carrier 21 and a calculated value of the temperature T of the ceramic carrier 21 based on the measured value of the resistance R, the corrected R-T characteristic would be different from the actual R-T characteristic between the measured resistance and an actual value of the temperature T of the ceramic carrier 21. In other words, the R-T characteristic would be erroneously learned. This would reduce the accuracy of calculation of the temperature T of the ceramic carrier 21 using the erroneously learned reference R-T characteristic.

In view of the aforementioned circumstances, the temperature calculating apparatus according to the first embodiment is configured to obtain values Tg of the temperature T of the ceramic carrier 21 and corresponding values Rg of the resistance R thereof in a learning mode with the ceramic carrier 21 deenergized, and correct the R-T characteristic stored in the storage medium 25b based on the obtained values Tg and Rg.

Figure 5:
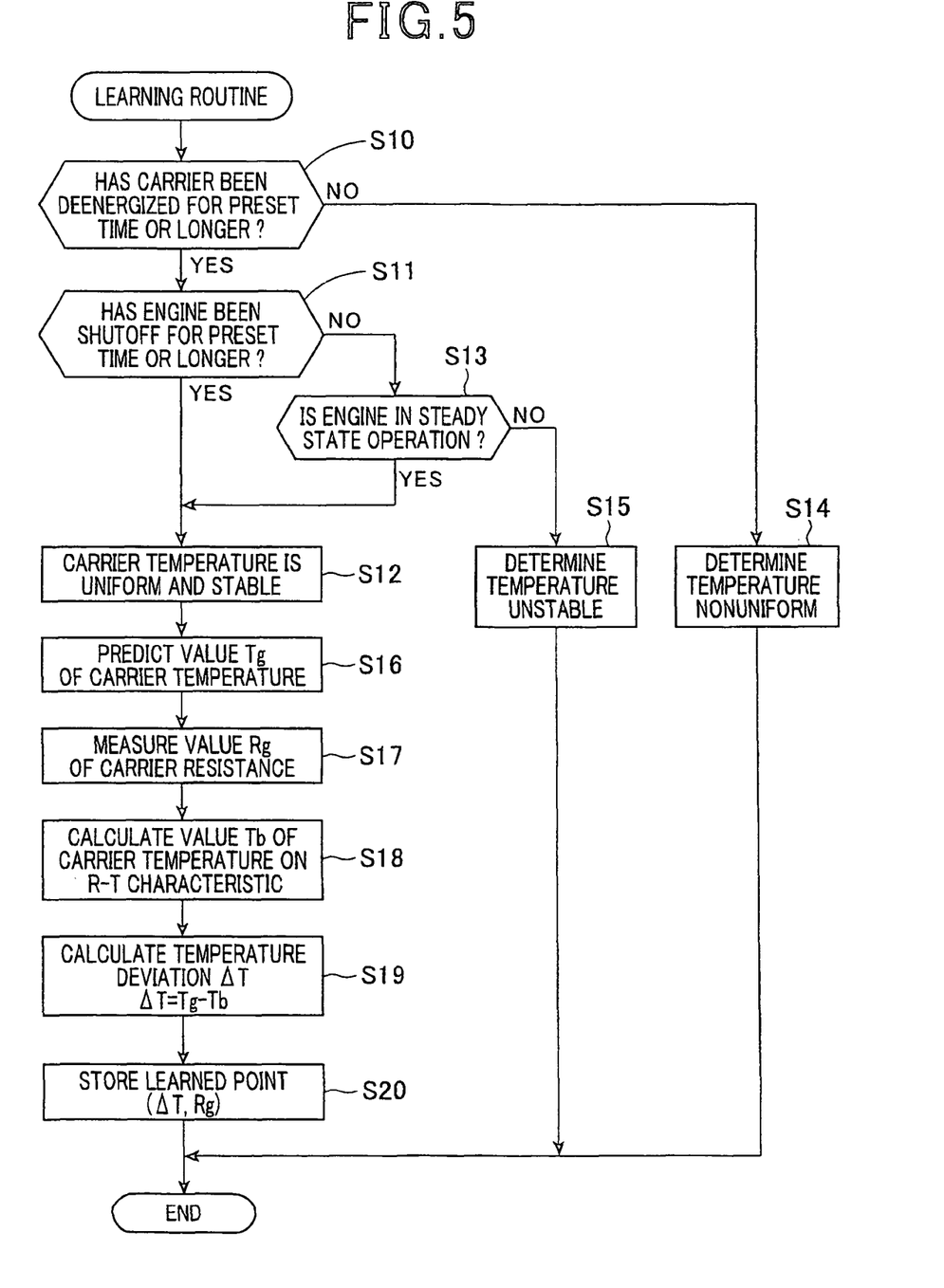
FIG. 5 is a flowchart schematically illustrating a learning routine to be executed by the CPU of a controller in accordance with a learning program according to the first embodiment.

FIG. 5 is a flowchart schematically illustrating a learning routine to be executed by the CPU 25a in the learning mode in accordance with the learning program PR1. In other words, the power supply system PS operates in the learning mode for learning the deviation of the R-T characteristic stored in the storage medium 25b from an actual R-T characteristic. The CPU 25a repeatedly runs the learning program PR1 in a preset cycle.

When launching the learning program PR1, the CPU 25a determines whether the ceramic carrier 21 has been deenergized for a preset time or longer, more specifically, the switch 24a has been off for the preset time or longer in step S10. Upon determining that the ceramic carrier 21 has been deenergized for the preset time or longer (the switch 24a has been off for the preset time or longer; YES in step S10), the CPU 25a considers that there is not temperature nonuniform distribution in the ceramic carrier 21, proceeding to step S11. Otherwise, upon determining that the ceramic carrier 21 has not been deenergized for the preset time or longer (the switch 24a has not been off for the preset time or longer; NO in step S10), the CPU 25a determines that there may be temperature nonuniform distribution in the ceramic carrier 21 in step S14, terminating the learning program PR1.

After the affirmative determination in step S10, the CPU 25a determines whether the engine 10 has been shutoff for a preset time or longer in step S11. Upon determining that the engine 10 has been shutoff for the preset time or longer (YES in step S11), the CPU 25a determines that the temperature T of the ceramic carrier 21 is in stable condition without variation in step S12. Otherwise, upon determining that the engine 10 has not been shutoff for the preset time or longer (NO in step S11), the CPU 25a proceeds to step S13 and determines whether the engine 10 is in steady-state operation in step S13.

Upon determining that the engine 10 is in the steady-state operation (YES in step S13), the CPU 25a proceeds to step S12, and determines that the temperature T of the ceramic carrier 21 is in the stable condition without variation in step S12. Otherwise, upon determining that the engine 10 is not in the steady-state operation (NO in step S13), the CPU 25a determines that the temperature T of the ceramic carrier 21 is in unstable condition with wide variation per short period of time in step S15, terminating the learning program PR1.

For example, in step S13, the CPU 25a obtains the engine load by, for example, the throttle position of the throttle valve of the engine 10 via a line L (see FIG. 1) measured by a throttle position sensor 35 of the engine 10 as the engine load, and determines that the engine 10 is in the steady-state operation by determining that the engine load has been substantially constant for a preset time or longer. As another example, the CPU 25a obtains the temperature of the exhaust emissions measured by an exhaust temperature sensor 40 (see FIG. 1) of the engine 10, and determines that the engine 10 is in the steady-state operation by determining that the variations in the obtained temperature of the exhaust emissions are within a preset temperature range. One of the line L and the exhaust temperature sensor 40 can be omitted in the power supply system PS if the other thereof is provided in the power supply system PS.

To sum up, in order to carry out the learning of the deviation, values Rg of the resistance R of the ceramic carrier 21 and values Tg of the temperature T thereof obtained based on a physical parameter different from the resistance R should be obtained with the ceramic carrier 21 being in temperature uniform distribution. Thus, the CPU 25a uses, as conditions for obtaining the values Rg of the resistance R and the values Tg of the temperature T, the conditions including:

the first condition is whether there is temperature uniform state in the ceramic carrier 21 without temperature nonuniform distribution; and the second condition is whether the temperature T of the ceramic carrier 21 is stable, which allows the CPU 25a to calculate the temperature T of the ceramic carrier 21.

That is, upon determining that the first and second conditions are met in step S12, the CPU 25a proceeds to step S16 and operates in the learning mode to obtain (calculate) a value (an actual value) Tg of the temperature T of the ceramic carrier 21 at this time in step S16. Specific examples of how to obtain a value Tg of the temperature T of the ceramic carrier 21 in step S16 will be sequentially described hereinafter.

As the first approach, when it is determined that the engine 10 has been shutdown for the preset time or longer (YES in step S10), the CPU 25a obtains the temperature of outside air measured by an outside-air temperature sensor 45 (see FIG. 1) of the engine 10 as the temperature T of the ceramic carrier 21.

As the second approach, when it is determined that the engine 10 has been shutdown for the preset time or longer (YES in step S10), the CPU 25a obtains the temperature of an engine coolant measured by an engine coolant temperature sensor 50 (see FIG. 1) of the engine 10 as the temperature T of the ceramic carrier 21.

As the third approach, when it is determined that the engine 10 has been shutdown for the preset time or longer (YES in step S10), the CPU 25a obtains at least one of the temperature of the intake air to the engine 10 measured by an intake-air temperature sensor 55 (see FIG. 1) of the engine 10 and the temperature of the exhaust emissions measured by the exhaust temperature sensor 40, and considers that the obtained temperature of the intake air or the exhaust emissions is identical to the temperature T of the ceramic carrier 21.

As the fourth approach, when it is determined that the engine 10 has been in the steady-state operation (YES in step S13), the CPU 25a calculates the temperature T of the ceramic carrier 21 based on the operating conditions of the engine 10. Specifically, the CPU 25a calculates the temperature of the exhaust emissions according to the operating conditions of the engine 10, and calculates the temperature T of the ceramic carrier 21 based on the calculated temperature of the exhaust emissions.

In this approach, because reaction heat is caused by oxidation-reduction reaction of the catalyst 21b of the EHC converter 21, the CPU 25a calculates the temperature T of the ceramic carrier 21 as the sum of the calculated temperature of the exhaust emissions and an estimated temperature rise due to the reaction heat.

Similarly, the CPU 25a can obtain the temperature of at least one of the outside-air temperature, the temperature of the intake air, and the temperature of the engine coolant according to the operating conditions of the engine 10, and estimate the temperature T of the ceramic carrier 21 based on the obtained temperature of at least one of the outside-air temperature, the temperature of the intake air, the temperature of the engine coolant, and the estimated temperature rise due to the reaction heat.

Following the operation in step S16, the CPU 25a obtains, in the learning mode, a value Rg of the resistance R of the ceramic carrier 21 at the obtaining of the value Tg of the temperature T in step S17. Specifically, the CPU 25a instantly turns on the switch 24a during the ceramic carrier 21 deenergized to calculate the value of the resistance R equivalent to the combined resistance of the resistance values of the resistors R1 to R5 based on the current value measured by the current sensor 24c with the switch 24a instantly on and the terminal voltage of the battery 24b. The calculated value of the resistance R is as a value Rg of the resistance R of the ceramic carrier 21.

Next, the CPU 25a references the R-T characteristic of the map M1 using the value Rg of the resistance R of the ceramic carrier 21 obtained in the learning mode as a key to extract, based on a result of the reference, a value Tb of the temperature T of the ceramic carrier 21 corresponding to the value Rg of the resistance R thereof. In other words, the CPU 25a converts the value Rg of the resistance R of the ceramic carrier 21 into the value Tb of the temperature T using the R-T characteristic of the map M1.

In step S19, the CPU 25a calculates the deviation ΔT between the value Tb of the temperature T calculated in step S18 and the actual value (value Tg) of the temperature T obtained in step S16. The deviation ΔT corresponds to the deviation of an actual R-T characteristic from the reference R-T characteristic due to individual differences of conductive carriers and the aging variations thereof.

In step S20, the CPU 25a stores, in the storage medium 25b, a pair of the deviation ΔT calculated in step S19 and the corresponding value Rg of the resistance R as a learned pair at a learned point. Note that the deviation ΔT changes with change in either the corresponding value (the resistance value Rg) of the resistance R or the corresponding value (the temperature value Tg) of the temperature T.

For this reason, repeated executions of the learning routine illustrated in FIG. 5 in the learning mode obtain a preset number of pairs of a value of the deviation ΔT and a value Rg of the resistance R for a plurality of learned points. For example, FIG. 4 illustrates that values ΔT1, ΔT2, and ΔT3 of the deviation ΔT are calculated for respective values Rg1, Rg2, and Rg3 of the resistance R, in other words, three learned points (Rg1, ΔT1), (Rg2, ΔT2), and (Rg3, ΔT3) are calculated.

After calculation of the preset number of learned points, the CPU 25a carries out linear interpolations between the adjacent learned points in step S20. In step S20, the CPU 25a stores, as learned correction data for the R-T characteristic stored in the storage medium 25b, data indicative of a correlation between a resistance value of each of the learned points and a deviation of a corresponding learned point in the storage medium 25b; the deviation represents a correction value of the temperature T of the ceramic carrier 21. For example, as the correlation, a relational equation (function) between a resistance value of each of the learned points and a deviation of a corresponding learned point in the storage medium 25b is obtained as the learned correction data for the R-T characteristic. Thereafter, the CPU 25a terminates the learning program PR1.

Figure 6:
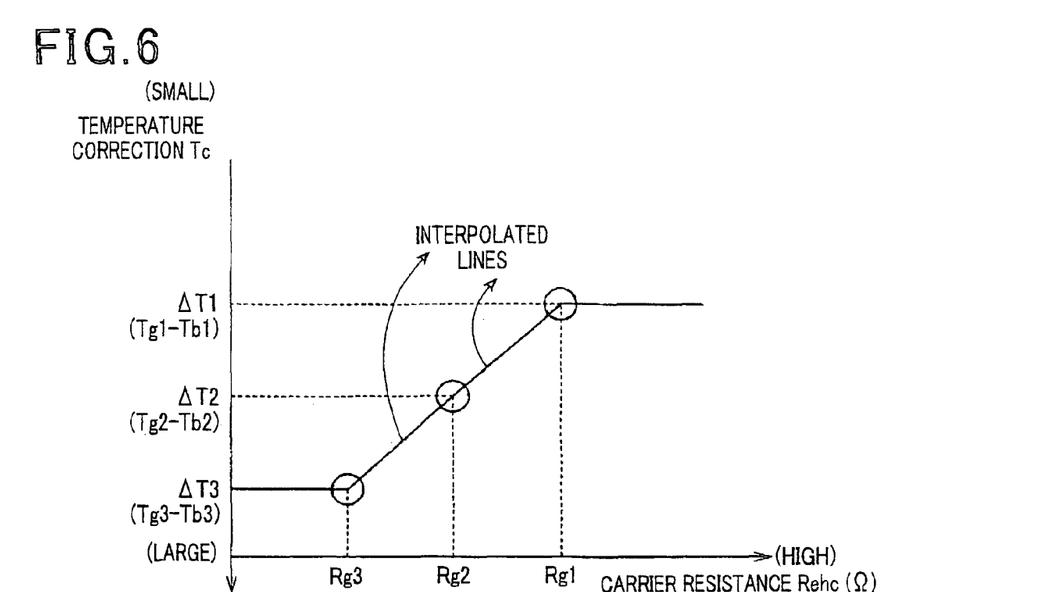
FIG. 6 is a graph schematically illustrating three learned points and the interpolated lines therebetween according to the first embodiment.

FIG. 6 shows the three learned points as the three pairs (Rg1, ΔT1), (Rg2, ΔT2), and (Rg3, ΔT3), and the interpolated lines between the respective three pairs (Rg1, ΔT1), (Rg2, ΔT2), and (Rg3, ΔT3).

Figure 7:
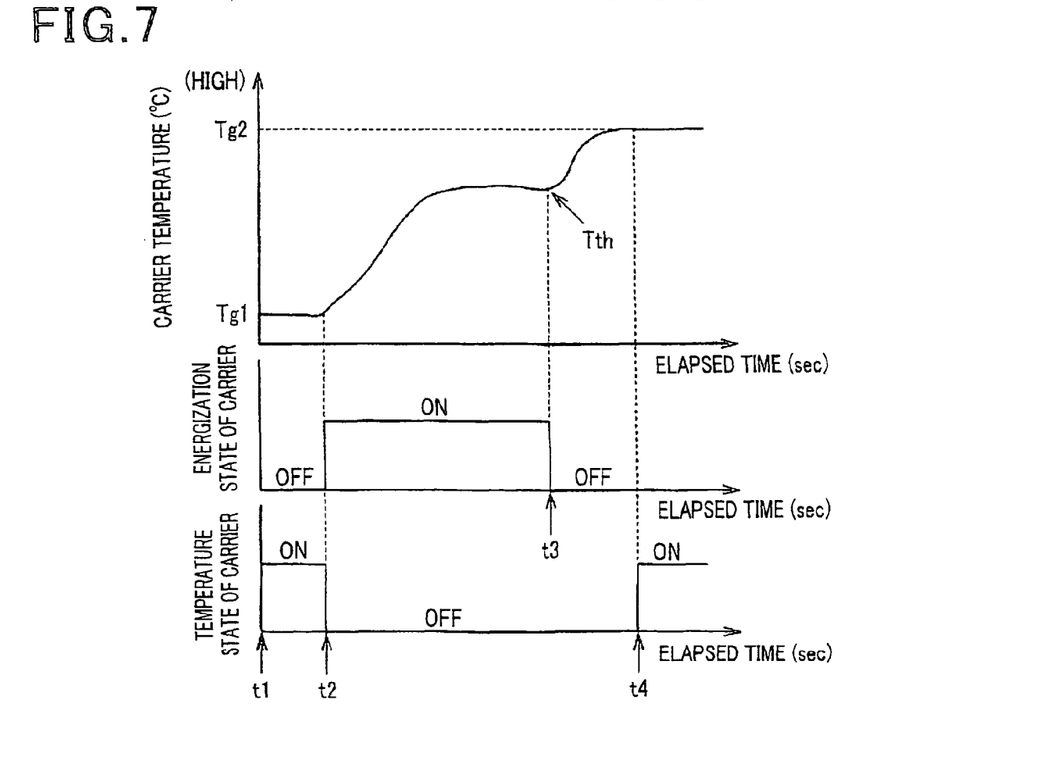
FIG. 7 is a timing chart schematically illustrating the transitions of the temperature of the ceramic carrier, the energization state of the ceramic carrier, and the temperature state of the ceramic carrier according to the first embodiment.

FIG. 7 is a timing chart schematically illustrating the transitions of the temperature T of the ceramic carrier 21, the energization state of the ceramic carrier 21, and the temperature state of the ceramic carrier 21.

During the period between the driver's turning on of an ignition switch of the motor vehicle at time t1 and the start of energization of the ceramic carrier 21 at time t2, the energization state of the ceramic carrier 21 is OFF indicative of the ceramic carrier 21 being deenergized because no power is supplied to the ceramic carrier 21. Because a sufficient time longer than the preset time has elapsed since the previous deenergization timing of the ceramic carrier 21, the determination in step S10 is affirmative so that it is determined that the ceramic carrier 21 is in temperature uniform state at the time t1 (see step S12).

In addition, because a sufficient time longer than the preset time has elapsed since the previous shutdown timing of the engine 10, the determination in step S11 is affirmative so that it is determined that the temperature T of the ceramic carrier 21 is in stable condition (see "ON" of the temperature state of the ceramic carrier 21 in FIG. 7) at the time t1 (see step S12).

Thus, during the period between the time t1 and the time t2, the obtaining of the temperature value Tg1 and the measurement of the resistance value Rg1 in the learning mode are carried out (see steps S16 and S17) so that the pair of the deviation ΔT1 and the resistance value Rg 1 is stored in the storage medium as a first learned pair (see step S20).

Next, before engine start-up, the switch 24a is turned on to start power supply power to the ceramic carrier 21 at time t2 (see "ON" of the energization state of the ceramic carrier 21). This causes the temperature T of the ceramic carrier 21 to rise from the value Tg1. When the temperature T of the ceramic carrier 21 reaches the activation temperature Tth at t3, the switch 24a is turned off so that warm-up of the ceramic carrier 21 is stopped.

During the period from the time t3 to time t4, the ceramic carrier 21 is heated by the exhaust emissions with high temperature out of the engine 21, resulting in an increase in the temperature T of the ceramic carrier 21 (see "OFF" of the temperature state of the ceramic carrier 21 representing unstable temperature state of the ceramic carrier 21). Thereafter, the temperature T of the ceramic carrier 21 is in stable condition at time t4 because the engine 10 is in steady-state operation (see "OFF" of the temperature state of the ceramic carrier 21). Thus, during the period from the time t2 to the time t3, the determination in step S10 is negative, and during the period from the time t3 to the time t4, the determination in step S13 is negative, resulting in that the learning set forth above is not carried out during the period from the time t2 to the time t4.

After the time t4 at which the ceramic carrier 21 is deenergized with the engine 10 being in steady-state operation (see "OFF" of the energization state of the ceramic carrier 21 and "ON" of the temperature state of the ceramic carrier 21), the affirmative determination in step S13 is carried out. Thus, the obtaining of the temperature value Tg2 and the measurement of the resistance value Rg2 are carried out in the learning mode (see steps S16 and S17) so that the pair of the temperature value Tg2 and the resistance value Rg2 is stored in the storage medium as a second learning pair (see step S20).

Thereafter, the pair of the temperature value Tg3 and the resistance value Rg3 are obtained in the same manner as the pair of the temperature value Tg2 and the resistance value Rg2 to be stored in the storage medium 25*b*.

Figure 8:
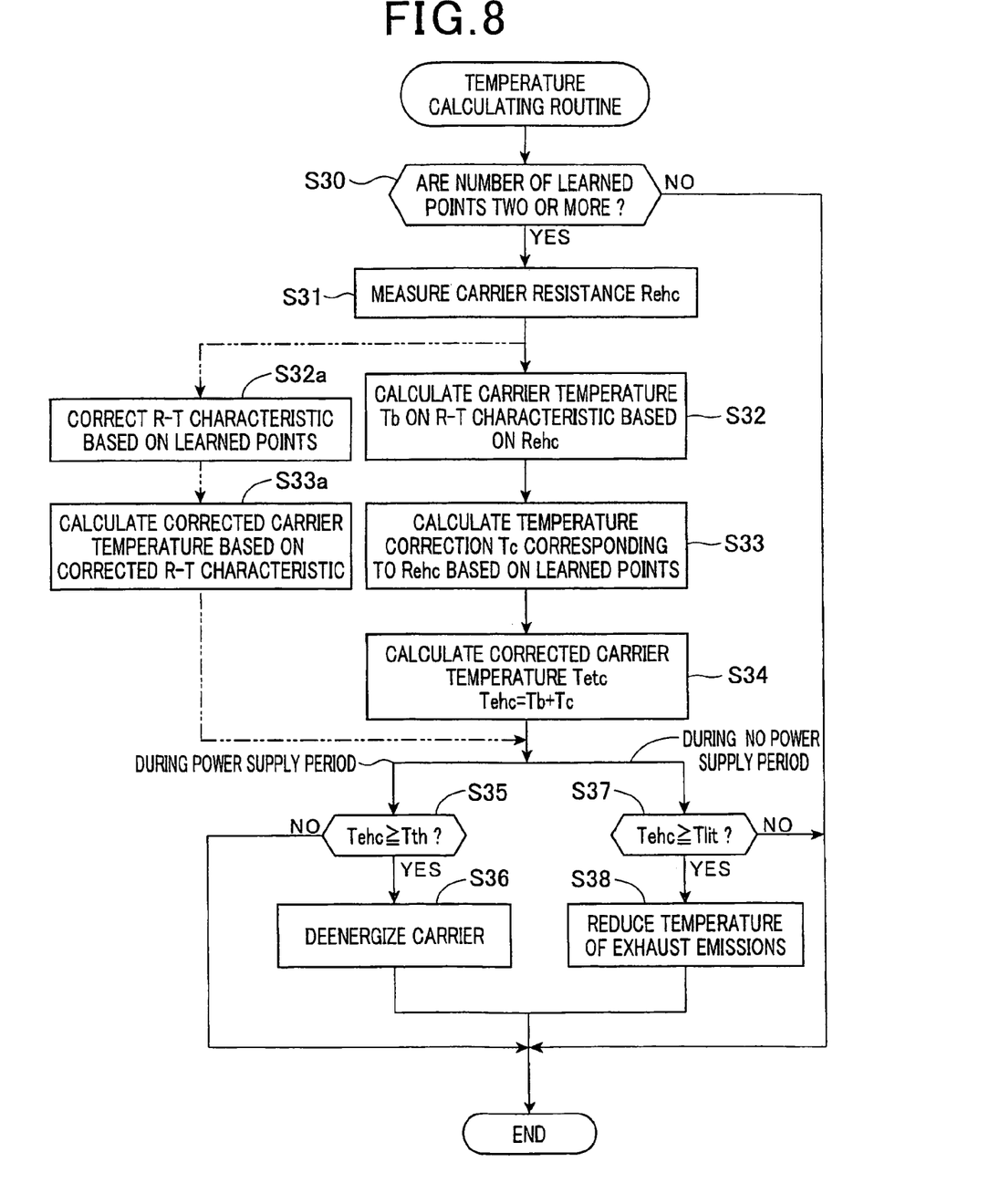
FIG. 8 is a flowchart schematically illustrating a temperature calculating routine to be executed by the CPU of the controller in accordance with a temperature calculating program according to the first embodiment.

FIG. 8 is a flowchart schematically illustrating a temperature calculating routine to be executed by the CPU 25*a* in normal operation mode of the temperature calculating apparatus after the learning mode in accordance with the temperature calculating program PR2. The CPU 25*a* repeatedly runs the temperature calculating program PR2 in a preset cycle.

Note that, as illustrated in FIG. 7, the CPU 25*a* in the normal operating mode is programmed to turn on the switch 24*a* to continuously supply power to the ceramic carrier 21 during the period from the time t2 to the time t3 at which the temperature T of the ceramic carrier 21 reaches the activation temperature Tth. This makes it possible to activate the EHC converter 20 as early as possible. During the power supply period to the ceramic carrier 21, the CPU 25*a* calculates a value Tehc of the temperature T of the ceramic carrier 21 in accordance with the sequence of the operations illustrated in FIG. 8. The calculated value Tehc is used to determine whether the temperature T of the ceramic carrier 21 reaches the activation temperature Tth.

In addition, during no power-supply period to the ceramic carrier 21, the CPU 25*a* in the normal operating mode instantly turns on the switch 24*a* during the ceramic carrier 21 deenergized to calculate a value Rehc of the resistance R of the ceramic carrier 21, and calculates a value Tehc of the ceramic carrier 21 corresponding to the value Rehc of the ceramic carrier 21 in accordance with the sequence of the operations illustrated in FIG. 8. Then, if the calculated value Tehc of the ceramic carrier 21 reaches a preset upper limit value Tu, the CPU 25*a* controls the operating conditions of the engine 10 to reduce the temperature of the exhaust emissions, thus avoiding a risk of thermal damage of the ceramic carrier 21.

When launching the temperature calculating program PR2, the CPU 25*a* determines whether the number of learned points obtained in the sequence of the operations illustrated in FIG. 5, that is, the number of learned points stored in the learned correction data is equal to or greater than two in step S30. Upon determining that the number of learned points stored in the learned correction data is smaller than two (NO in step S30), the CPU 25*a* terminates the temperature calculating program PR2 because it cannot carry out linear interpolations illustrated in FIG. 6.

Otherwise, upon determining that the number of learned points stored in the learned correction data is equal to or greater than two (YES in step S30), the CPU 25*a* calculates the value Rehc of the resistance R equivalent to the combined resistance of the resistance values of the resistors R1 to R5 based on the current value measured by the current sensor 24*c* and the terminal voltage of the battery 24*b* in step S31.

Next, the CPU 25*a* references the R-T characteristic of the map M1 using the value Rehc of the resistance R of the ceramic carrier 21 measured in step S31 as a key to extract, based on a result of the reference, a value Tb of the temperature T of the ceramic carrier 21 corresponding to the value Rehc of the resistance R thereof in step S32.

Then, the CPU 25*a* calculates a correction value Tc of the temperature T of the ceramic carrier 21 corresponding to the value Rehc of the resistance R of the ceramic carrier 21 based on the learned correction data for the R-T characteristic stored in the storage medium 25*b* in step S33.

Specifically, in step S33, the CPU 25*a* references the learned correction data (relational expression) for the R-T characteristic stored in the storage medium 25*b* using the value Rehc of the resistance R of the ceramic carrier 21 as a key to extract, based on a result of the reference, a correction value Tc of the temperature T of the ceramic carrier 21 corresponding to the value Rehc of the resistance R thereof.

Next, in step S34, the CPU 25*a* adds the correction value Tc calculated in step S33 to the value Tb of the temperature T of the ceramic carrier 21, thus calculating a corrected value Tech of the temperature T of the ceramic carrier 21. This operation in step S34 means correction of the R-T characteristic stored in the storage medium 25*b*.

Thereafter, as described above, during a power supply period to the ceramic carrier 21, the CPU 25*a* determines whether the corrected value Tehc of the temperature T of the ceramic carrier 21 calculated in step S34 is equal to or higher than the activation temperature Tth in step S35.

Upon determining that the corrected value Tehc of the temperature T of the ceramic carrier 21 calculated in step S34 is lower than the activation temperature Tth (NO in step S35), the CPU 25*a* terminates the temperature calculating program PR2. Otherwise, upon determining that the corrected value Tehc of the temperature T of the ceramic carrier 21 calculated in step S34 is equal to or higher than the activation temperature Tth (YES in step S35), the CPU 25*a* turns off the switch 24*a*, thus stopping the supply of power to the ceramic carrier 21 in step S36, and thereafter, terminating the temperature calculating program PR2.

On the other hand, as described above, during no power-supply period to the ceramic carrier 21, the CPU 25*a* determines whether the corrected value Tehc of the temperature T of the ceramic carrier 21 calculated in step S34 is equal to or higher than the upper limit value Tu of the temperature T of the ceramic carrier 21 calculated in step S37.

Upon determining that the corrected value Tehc of the temperature T of the ceramic carrier 21 calculated in step S34 is lower than the upper limit value Tu (NO in step S37), the CPU 25*a* terminates the temperature calculating program PR2. Otherwise, upon determining that the corrected value Tehc of the temperature T of the ceramic carrier 21 calculated in step S34 is equal to or higher than the upper limit value Tu (YES in step S37), the CPU 25*a* controls the operating conditions of the engine 10 to reduce the temperature of the exhaust emissions, thus avoiding a risk of thermal damage of the ceramic carrier 21 in step S38, and thereafter, terminating the temperature calculating program PR2.

As described above, the temperature calculating apparatus according to the first embodiment is configured to obtain, in the learning mode, plural pairs of values Rg of the resistance R of the ceramic carrier 21 and corresponding values Tg of the temperature T thereof during no power supply to the ceramic carrier 21, and correct the R-T characteristic stored in the storage medium 25*b* based on the plural pairs of the values Rg of the resistance R of the ceramic carrier 21 and the corresponding values Tg of the temperature T thereof.

The configuration of the temperature calculating apparatus according to the first embodiment makes it possible to correct the reference R-T characteristic stored in the storage medium 25*b* based on the plural pairs of the values Rg of the resistance R of the ceramic carrier 21 and the corresponding values Tg of the temperature T thereof for learning; these plural pairs of the values Rg and Tg are obtained in the learning mode in which no current locally flows through the lower-resistance portion 21p in the ceramic carrier 21, in other words, in which the lower-resistance portion 21p is substantially identical in temperature to another portion of the electrically conducting path of the ceramic carrier 21.

Accordingly, it is possible to calculate a value of the temperature T of the ceramic carrier 21 based on the corrected R-T characteristic with high accuracy.

The temperature calculating apparatus according to the first embodiment should obtain values Rg of the temperature T of the ceramic carrier 21 based on a physical parameter different from the resistance R of the ceramic carrier 21 when carrying out the learning routine illustrated in FIG. 5.

In view of this point, because the temperature of the outside air or the engine coolant can be considered to be substantially identical to the temperature T of the ceramic carrier 21 during the engine 10 being shutoff, it is possible to obtain values Tg of the temperature T of the ceramic carrier 21 with high accuracy. That is, the temperature calculating apparatus according to the first embodiment corrects the R-T characteristic stored in the storage medium 25b using plural pairs of values Rg of the resistance R of the ceramic carrier 21 and corresponding values Tg of the temperature T thereof for learning; these plural pairs of the values Rg and Tg are calculated in the learning mode when the engine 10 has been shutdown for a sufficient time. Thus, the configuration of the temperature calculating apparatus according to the first embodiment makes it possible to correct the reference R-T characteristic stored in the storage medium 25b with high accuracy.

During the engine 10 being in steady-state operation, the temperature calculating apparatus according to the first embodiment is configured to obtain values Tg of the temperature T of the ceramic carrier 21 based on a correlation between the temperature T of the ceramic carrier 21 and at least one of the outside-air temperature, the temperature of the intake air, the temperature of the exhaust emissions, and the temperature of the engine coolant.

That is, the temperature calculating apparatus according to the first embodiment corrects the R-T characteristic stored in the storage medium 25b using plural pairs of values Rg of the resistance R of the ceramic carrier 21 and corresponding values Tg of the temperature T thereof; these plural pairs of the values Rg and Tg are obtained with high accuracy during the engine 10 being in the steady-state operation. Thus, the configuration of the temperature calculating apparatus according to the first embodiment makes it possible to correct the reference R-T characteristic stored in the storage medium 25b with high accuracy.

Because the ceramic carrier 21 is used as a conductive carrier of the EHC converter 20, it is possible to calculate, with high accuracy, a value of the temperature T of the ceramic carrier 21 based on a measured value of the resistance R thereof because, in the ceramic carrier 21, large change appears with change in the temperature of the ceramic carrier 21. In addition, because ceramic carriers have heat resistance higher than that of metal carriers, it is possible to more reduce a risk of thermal damage of the ceramic carrier 21 in comparison to a metal carrier. Moreover, because ceramic carriers have electric resistance higher than metal carriers, it is possible to obtain a desired amount of heat in the ceramic carrier 21 by only supplying a fine current from the power source 24 to the ceramic carrier 21. Thus, it is possible to eliminate the need to supply a large current from the power source 24 to the ceramic carrier 21, thus keeping low the cost of the power source 24.

Particularly, the ceramic carrier 21 having the NTC characteristic causes the amount of heat of the lower resistance portion (locally heated portion) 21p of the ceramic carrier 21 corresponding to the resistor R1 to increase more than another unit portion. As the locally heated portion 21p drops in resistance, the locally heated portion 21p more increases in temperature, accelerating an increase in the temperature of the locally heated portion 21p, and therefore, increasing the variations in the temperature distribution of the ceramic carrier 21. However, in the first embodiment, the CPU 25a calculates, with high accuracy, values of the temperature T of the ceramic carrier 21 under the situation in which current uniformly flows through the electrically conducting path of the ceramic carrier 21 between the positive and negative electrodes 22 and 23.

Note that, as described above, the normal operation mode includes a period during which the ceramic carrier 21 is energized and a period during which the temperature T of the ceramic carrier 21 is calculated (measured).

The present disclosure is not limited to the aforementioned embodiment, and can be modified as follows.

The CPU 25a according to the first embodiment is configured to obtain a value of the temperature of the exhaust emissions according the operating conditions of the engine 10, and obtain values Tg of the temperature T of the ceramic carrier 21 based on the obtained temperature of the exhaust emissions in the fourth approach, but the present disclosure is not limited to the configuration.

Specifically, as the second embodiment, the CPU 25a can obtain values Tg of the temperature T of the ceramic carrier 21 based on the temperature of the exhaust emissions measured by an exhaust temperature sensor 40 of the engine 10.

The CPU 25a according to the first embodiment is programmed to calculate the value Rehc of the resistance R of the ceramic carrier 21 as long as it is determined that the number of learned points stored in the learned correction data is equal to or greater than two (see steps S30 and S31), but the present disclosure is not limited thereto.

Specifically, as the third, embodiment, the CPU 25a can:

calculate a value Rehc of the resistance R corresponding to a value Rg of the resistance R in one learned pair of the value Rg of the resistance R and a value Tg of the temperature T in step S31;

calculate a value Tb of the ceramic carrier 21 on the R-T characteristic corresponding to the value Rehc (Rg) of the resistance R; and calculate a correction value Tc of the temperature T corresponding to the value Rehc based on the one learned pair.

In addition, as the third embodiment, the range within which the temperature T of the ceramic carrier 21 can move can be divided into a plurality of sections, and the CPU 25a can be programmed to calculate a value Rehc of the resistance R of the ceramic carrier 21 as long as it is determined that a learned pair of a value Rg of the resistance R of the ceramic carrier 21 and a corresponding value Tg of the temperature T thereof for each of the plurality of sections (see steps S30 and S31).

In each of the first to third embodiments, the present disclosure is applied to the EHC converter 20 using the ceramic carrier 21 illustrated as an example in FIG. 2, but can be applied to an EHC member using a conductive catalyst carrier, such as a metal catalyst carrier.

In each of the first to third embodiments, the present disclosure is applied to the EHC converter whose carrier has the NTC characteristic set forth above, but can be applied to an EHC converter whose carrier does not have the NTC characteristic, that is, whose carrier has a characteristic in which electric resistance rises with temperature increase.

In step S20, the CPU 25a is programmed to store, in the storage medium 25b, a pair of a deviation ΔT calculated in step S19 and a corresponding value Rg of the resistance R as a learned pair at a learned point, but can be programmed to store, in the storage medium 25b, a pair of a value Rg of the resistance R and a corresponding value Tg of the temperature T. For example, as illustrated in FIG. 3, three learned points (Rg1, Tg1), (Rg2, Tg2), and (Rg3, Tg3) can be stored in the storage medium in steps S19 and S20.

In steps S32 to S34, the CPU 25a is programmed to calculate a value Tb of the temperature T of the ceramic carrier 21 on the R-T characteristic stored in the storage medium 25a, and correct the calculated value Tb of the temperature T of the ceramic carrier 21 based on a plurality of learned points to thereby calculate a corrected value Tehc of the temperature T of the ceramic carrier 21, but the present disclosure is not limited thereto.

Specifically, the CPU 25a can be programmed to correct the R-T characteristic stored in the storage medium 25b based on a plurality of learned points in step S32a of FIG. 8, and calculate a value Tehc of the temperature T of the ceramic carrier 21 based on the corrected R-T characteristic in step S33a of FIG. 8.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be constructed as non-exclusive.

What is claimed is:

1. A catalyst temperature calculating apparatus applied for conductive carrier of a catalyst in catalysts for cleaning an exhaust emission out of an internal combustion engine, the conductive carrier heating up when energized, the catalyst temperature calculating apparatus comprising:
   a temperature estimating unit configured to estimate, as a learning temperature, the temperature of the conductive carrier during a deenergization period of the conductive carrier being deenergized based on a physical parameter different from a resistance of the conductive carrier;
   a resistance obtaining unit configured to energize, when the estimation is carried out by the temperature estimating unit, the conductive carrier to obtain an instantaneous value of resistance of the conductive carrier at the moment the estimate is carried out as a learning resistance; and
   a catalyst temperature calculating unit configured to detect a value of the resistance of the conductive carrier during the conductive carrier being energized to heat up, and calculate a value of the temperature of the conductive carrier upon the conductive carrier being energized based on: the detected value, the learning temperature, and the learning resistance.

2. The catalyst temperature calculating apparatus according to claim 1, wherein the temperature estimating unit is configured to estimate a value of the temperature of the conductive carrier with the internal combustion engine being shutdown during the deenergization period as one of the learning temperature.

3. The catalyst temperature calculating apparatus according to claim 2, wherein the temperature estimating unit is configured to estimate a value of the temperature of the conductive carrier with the internal combustion engine being in steady-state operation during the deenergization period as one of the learning temperature.

4. The catalyst temperature calculating apparatus according to claim 3, wherein the temperature estimating unit is configured to estimate the value of the temperature of the conductive carrier with the internal combustion engine being in the steady-state operation based on temperature rise of the temperature of the conductive carrier due to reaction heat caused when the exhaust emission is cleaned by the catalyst.

5. The catalyst temperature calculating apparatus according to claim 2, wherein the physical parameter used by the temperature estimating unit is at least one of measured values of an outside air temperature sensor, an engine coolant sensor, an intake-air temperature sensor, and an exhaust emission temperature sensor.

6. The catalyst temperature calculating apparatus according to claim 1, wherein the temperature estimating unit is configured to estimate a value of the temperature of the conductive carrier with the internal combustion engine being in steady-state operation during the deenergization period as one of the learning temperature.

7. The catalyst temperature calculating apparatus according to claim 6, wherein the temperature estimating unit is configured to estimate the value of the temperature of the conductive carrier with the internal combustion engine being in the steady-state operation based on temperature rise of the temperature of the conductive carrier due to reaction heat caused when the exhaust emission is cleaned by the catalyst.

8. The catalyst temperature calculating apparatus according to claim 6, wherein the physical parameter used by the temperature estimating unit is a measured value of an exhaust-emission temperature sensor.

9. The catalyst temperature calculating apparatus according to claim 1, wherein the conductive carrier is a ceramic conductive carrier.

10. The catalyst temperature calculating apparatus according to claim 9, wherein the ceramic conductive carrier has a characteristic in which resistance drops with temperature increase.

11. The catalyst temperature calculating apparatus according to claim 1, further comprising:
    a determining unit configured to determine whether the temperature of the conductive carrier is in a stable condition,
    the temperature estimating unit being configured to determine whether to perform estimation of the temperature of the conductive carrier based on a result of the determination by the determining unit.

12. The catalyst temperature calculating apparatus according to claim 11, wherein the determining unit is configured to:
    determine whether the conductive carrier has been deenergized for a preset time or longer; and
    determine that the temperature of the conductive carrier is in an unstable condition when it is determined that the conductive carrier has not been deenergized for the preset time or longer,
    the temperature estimating unit being configured to determine not to perform estimation of the temperature of the conductive carrier when it is determined that the temperature of the conductive carrier is in the unstable condition.

13. The catalyst temperature calculating apparatus according to claim 11, wherein the determining unit is configured to:

determine whether the internal combustion engine has been shutoff for a preset time or longer;
determine whether the internal combustion engine is in steady-state operation when it is determined that the internal combustion engine has not been shutoff for the preset time or longer; and
determine that the temperature of the conductive carrier is in an unstable condition when it is determined that the internal combustion engine is not in the steady-state operation,
the temperature estimating unit being configured to determine not to perform estimation of the temperature of the conductive carrier when it is determined that the temperature of the conductive carrier is in the unstable condition.

14. The catalyst temperature calculating apparatus according to claim 11, wherein the determining unit is configured to:
determine whether the conductive carrier has been deenergized for a preset time or longer;
determine whether the internal combustion engine has been shutoff for a preset time or longer;
determine whether the internal combustion engine is in steady-state operation when it is determined that the internal combustion engine has not been shutoff for the preset time or longer; and
determine that the temperature of the conductive carrier is in the stable condition when it is determined that:
the conductive carrier has been deenergized for the preset time or longer and that the internal combustion engine has been shutoff for the preset time or longer, or
the conductive carrier has been deenergized for the preset time or longer and the internal combustion engine is in the steady-state operation,
the temperature estimating unit being configured to determine to perform estimation of the temperature of the conductive carrier when it is determined that the temperature of the conductive carrier is in the stable condition.

* * * * *